US008740621B1

(12) United States Patent
Breidner

(10) Patent No.: US 8,740,621 B1
(45) Date of Patent: Jun. 3, 2014

(54) APPARATUS AND SYSTEM FOR LEARNING A FOREIGN LANGUAGE

(76) Inventor: Samuel Gordon Breidner, Little River, SC (US)

( * ) Notice: Subject to any disclaimer, the term of this patent is extended or adjusted under 35 U.S.C. 154(b) by 14 days.

(21) Appl. No.: 13/487,531

(22) Filed: Jun. 4, 2012

Related U.S. Application Data

(63) Continuation-in-part of application No. 11/879,349, filed on Jul. 17, 2007, now abandoned.

(51) Int. Cl.
*G09B 19/00* (2006.01)
*G09B 19/06* (2006.01)
*G09B 19/04* (2006.01)
*G09B 19/08* (2006.01)

(52) U.S. Cl.
CPC ................ *G09B 19/06* (2013.01); *G09B 19/04* (2013.01); *G09B 19/08* (2013.01)
USPC ........... 434/157; 434/156; 434/350; 434/336; 434/322

(58) Field of Classification Search
USPC .................. 434/156, 157, 350, 161, 222, 307
See application file for complete search history.

(56) References Cited

U.S. PATENT DOCUMENTS 3,271,884 A * 9/1966 Roberson ...................... 434/157
4,734,036 A 3/1988 Kasha
5,215,466 A 6/1993 Rubio
5,275,569 A * 1/1994 Watkins ........................ 434/157
5,735,693 A 4/1998 Groiss
5,810,598 A 9/1998 Wakamoto
6,024,571 A * 2/2000 Renegar ........................ 434/157
6,325,630 B1 12/2001 Grabmayr
6,341,958 B1 1/2002 Zilberman
6,409,510 B1 6/2002 Firebaugh
6,736,641 B2 * 5/2004 Quiroz .......................... 434/157
6,810,374 B2 10/2004 Kang
7,853,444 B2 * 12/2010 Wang et al. ........................ 704/2
7,881,928 B2 * 2/2011 Gao et al. ...................... 704/231
2002/0072039 A1 * 6/2002 Rtischev et al. .............. 434/157
2003/0074185 A1 * 4/2003 Kang ................................ 704/2
2003/0203343 A1 * 10/2003 Milner .......................... 434/157

* cited by examiner

*Primary Examiner* — Nikolai A Gishnock
*Assistant Examiner* — Banafsheh Hadizonooz
(74) *Attorney, Agent, or Firm* — P. Jeff Martin; The Law Firm of P. Jeffrey Martin, LLC

(57) ABSTRACT

A method for learning a foreign language using a learning aid is provided. The learning aid includes a reading manual having a plurality of pages organized into a number of sections which are read in an orderly fashion in order to facilitate incremental advancement and masterfulness concerning the learning of a target language. The method involves building an active foreign language alphabet and language as it is done naturally in user's native language. The learning aid further includes an interactive-based, task-oriented system integrated into software for upload onto a computer.

7 Claims, 11 Drawing Sheets

22

The cat is on the mat. The rat was on the hat. Pat the cat on the mat.
21    23      23  33
The cNt is on the mNt. The rNt was on the hNt. PNt the cNt on the mNt.
30   33         32       22
BNt the rNt on the hNt! Then the cNt sNt on the hNt. PNt the cNt on the mNt.
40

**

| COLUMN A | COLUMN B |
|---|---|
| O Lord, my God, | אלי, אלי |
| I prאy thאt these things never end: | שלא יגמר לעולם |
| The sאnd and the sea, | החול והים, |
| The rush of the wאters, | רשרוש של המים, |
| The crאsh of the heאvens, | ברק השמים, |
| The prאyer of the heאrt. | תפילת האדם. |
| The sאnd אnd the sea, | החול והים |
| The rush of the wאters, | רשרוש של המים |
| The crאsh of the heאvens, | ברק ה שמים |
| The prאyer of the heאrt. | תפילת האדם. |

FIG. 5

| COLUMN A | COLUMN B |
|---|---|
| O Lord, my God, | אלי, אלי, |
| I pray that these things never end: | שלא יגמר לעולם |
| The sand and the sea, | החול והים, |
| The rush of the waters, | רשרוש של חמים, |
| The crash of the heavens, | ברק השמים, |
| The prayer of the heart. | תפלת האדם. |
| The sand and the sea, | החול והים |
| The rush of the water, | רשרוש של המים |
| The crash of the heavens, | ברק ה שמים |
| The prayer of the heart. | תכילת האדם. |

APPARATUS AND SYSTEM FOR LEARNING A FOREIGN LANGUAGE

RELATED APPLICATIONS

The present invention is a Continuation-in-Part of application Ser. No. 11/879,349, filed on Jul. 17, 2007 now abandoned.

BACKGROUND OF THE INVENTION

1. Field of the Invention

The present invention relates generally to foreign language learning methods and, more particularly, to a method for learning a foreign language using a learning aid.

2. Description of the Related Art

Any program of learning by its very nature requires teaching, either by one's experience or by formal instruction. The process of teaching follows an interaction with anything that exists, and learning a relationship thereto.

To know or to discover and to identify anything that exists creates cognition, which is the act of knowing or identifying. Cognition may be called perception, according to each individuals' mode of learning (their modality). The task-oriented result is education.

A modification of individual behavior is education. It does not matter whether an individual is learning to tie shoelaces, to housebreak a dog, to resolve complex mathematical equations, or to develop a marketing campaign for canned chicken soup, education occurs when prior learning enables the modification to be achieved. However, achievement is based upon the elements of education functioning within two concepts, intelligence and/or intellect.

All humans exhibit intelligence, which may be defined as memory or recall. It is through experience that individuals proceed from conscious memory or recall to an imprinted action that requires no conscious effort. The experience of learning how to tie shoelaces or open or close a water faucet initially requires conscious memory/recall, but after repetitive actions a modification of behavior takes place and a stimulus to an individual will create a rote response, called imprinting. This basic element of education makes it possible for an individual to touch, type, play a piano, drive a car, or to read, write, and speak words that transmit thoughts.

All humans exhibit intellect in varying degrees, which is the ability to understand relationships. Intellect is the ability to take elements of intelligence and understand their relationship in order to produce reason, as an outcome of learning. This element of education is evidenced by a modification of behavior that may be called understanding or comprehension, and permits the individual to solve highly complex problems.

Everyone uses convergent thinking in order to do daily tasks, whether making breakfast, dressing, or going to the supermarket, intelligence permits routines to easily be accomplished. Repetitive tasks are more easily accomplished through convergent thinking operations. The degree to which individuals are convergent in their thinking is generally environmentally generated. Convergent thinkers tend to be very literal in their understandings of concepts, and especially new concepts. They tend to associate themselves with rigid and unyielding attitudes and policies regarding nation, political party, culture, organization, or a belief system in which they have been imprinted. The degree to which this behavioral mode impacts their education is a function of an individual's behavior modification. For convergent thinkers, utilizing a high-interest level material, which delivers immediate gratification where such material is transmitted through imprinting in one's native tongue and transmuted to a target language, can be a major driving force concerning motivation for implementing a method for learning a foreign language. Convergent thinkers rely heavily upon their intelligence (memory/recall). To the convergent thinker, a brick may be used to build a house, build a fireplace, construct a brick walkway, or to build a wall.

Environment plays a major role in creating divergent thinking skills. The ability to consider divergent understandings of learning anything is called intellect. Knowing or identifying anything is cognition, and once it is registered in the individual's memory, it may be re-cognated or recognized. Combinations of previously learned material are brought together by the divergent thinker in order to provide reasoned understandings of new concepts. These new concepts come together in a confluent amalgam to produce education, a new understanding that has modified the individual's behavior. Divergent thinkers rely heavily upon their intellect, the ability to see relationships. To the divergent thinker, a brick may be ground into red powder and mixed with plaster in order to make a relief map of the Rocky Mountains. Two bricks may be placed in a lavatory's reservoir to reduce water consumption. The inside of a brick may be hollowed and filled with jewelry for placement in a brick wall to hinder burglars.

Learning is completely dependent upon the individual's modalities during the act of cognition. A brief examination of some of the modalities of learning, and its impact upon the modification of the learner's behavior is imperative if education is to take place. Convergent and divergent thinking operations are performed by individuals using their favorite combination of methods for solving problems, because their experience has shown them that the mindset of methods they are using to think has been the most productive manner to learn anything they consider. Those methods of solving problems are called modalities.

Auditory discrimination is vital if the individual is to pursue language in a meaningful way. Primary to the effective use of a method for learning a foreign language, an understanding of the sounds of printed letters as they are blended together into a word which is identifiable as a component of an idea. This concept is referred to as codex. English language learners follow a phonetic approach, which is based on convergent thinking. These learners quickly move from decoding letters into sound, to whole word recognition in order to form word clusters that can be put together with lucidity. In the Anglo-Saxon language, sounds of the word are often different than the sounds in the word. The word "sugar" is not "soo-gar". The visual discrimination of gum/gun, when expressed in the context of a sentence, is often difficult if auditory discrimination has not be properly dealt with, as auditory discrimination proceeds visual discrimination in human development. For example, "He took the gum/gun in his hand," requires the use of divergent thinking abilities as the reader adjusts the literal decoding of the word as perceived and discriminates its meaning as evidence by the word's proper pronunciation because the reader is aware of the sense of the sentence. For example, "You can open the can." This visual discrimination follows perceptions/cognition and is completely dependent upon auditory discrimination.

The ability to read a map, follow a blueprint, understand a design, navigate a course, and conceive geometric concepts is the result of a schematic modality which has very important implications for learning. Many people have learned to read using flash cards which enable individuals to wee whole words that they might have difficulty spelling, such as Lieutenant, cafeteria, Mississippi, and boulevard. However, these words are readily understood in the context of a sentence thanks to schematic ability on the part of the reader. Schematic thinking occurs when the imprinting of the word's design is established in a convergent inventory of knowledge and it is this cognition that permits recognition of a word that represents identifiable thought. A common example is the Coca-Cola® logo.

Language learning for individuals with a strong figural modality can be strengthened using imprinting as an outcome of convergent thinking. The symbiotic relationship of mathematics to musical ability, which is often used in the playing of an instrument with both hands, requires the functional understanding of an equation. The popularity of Dr. Seuss's® basic use of poetical music in a series of children's books to young children, below the age of puberty, when a better understanding of relationships provokes intellectual thinking, gives testimony to the subliminal use of the music in our language and its importance in imprinting whole words, word clusters, and/or a codex in an individual's inventory of knowledge as a result of convergent thinking operations. Childish jingles, advertising slogans, popular tunes, the Psalms, and worship liturgics are understood and retained through the modality of figural thinking operations.

It is most often thought that there is a symbiotic relationship between age and maturity, and that is the reason children and adolescents tend to have a short attention span. That concept is false. Children and adolescents can absorb themselves in a video game or an age appropriate television show for hours at a time. Adults, at any age, evidence a very short attention span except for one intervening variable, their apperceptive base. Apperception is the ability to perceive clearly, to observe, to recognize and to have full understanding of the assimilation of new information as a result of convergent thinking (memory/recall) operations provoking the individual's inventory of knowledge, which may produce, in the case of a divergent thinker, intellectual outcomes. An expanded attention span fuels the desire not to leave in the middle of a movie, television show, interesting book or other sedentary intellectual involvement. An expanded attention span is often identified as motivation. It relies heavily upon an apperceptive base which motivates the individual's desire for an outcome concerning the current task-oriented activity. That outcome has been projected by the individual's prior inventory of knowledge. The motivating result is satisfaction, because the individual projected the end of the movie, the television show, the interesting book, or other activity. A method for learning a foreign language must provide high interest level, age-appropriate material, synchronized with a program which provides audio and visual discrimination and its concomitant delivery of a phoneme inventory to the learner.

In teaching a foreign language, many traditional methods have been utilized such as the translation method, the audio-lingual method, the direct method, and the total immersion method. These methods utilize memorization, grammar, repetition, speaking and listening, communication exchange, learning aids, and audio-visual media. However, the aforementioned conventional methods have been unsuccessful in providing a method by which a foreign language can be learned quickly, easily, and efficiently.

Accordingly, there is a widely recognized need for a method by which a foreign language can be learned by building an active foreign language alphabet in a natural way as it is done in user's native language in a manner which is quick, easy, and efficient. The development of the method for learning a foreign language fulfills this need.

A search of the prior art did not disclose any patents that read directly on the claims of the instant invention; however, the following references were considered related:

U.S. Pat. No. 6,325,630 B1, issued in the name of Grabmayr;

U.S. Pat. No. 4,734,036, issued in the name of Kasha;

U.S. Pat. No. 5,735,693, issued in the name of Groiss;

U.S. Pat. No. 5,810,598, issued in the name of Wakamoto;

U.S. Pat. No. 6,341,958 B1, issued in the name of Zilberman;

U.S. Pat. No. 6,409,510 B1, issued in the name of Firebaugh;

U.S. Pat. No. 6,736,641 B2, issued in the name of Quiroz;

U.S. Pat. No. 5,215,466, issued in the name of Rubio;

U.S. Pat. No. 3,271,884, issued in the name of Roberson;

U.S. Patent Application no. 2003/0203343 A1, published in the name of Milner;

U.S. Pat. No. 5,275,569, issued in the name of Watkins; and

U.S. Pat. No. 6,810,374 B2, issued in the name of Kang.

Consequently, a need has been felt for an improved method for learning a foreign language in a manner which is quick, easy, and efficient.

SUMMARY OF THE INVENTION

Therefore, it is an object of the present invention to provide a method by which a foreign language can be learned in a manner which is quick, easy, and efficient.

It is another object of the present invention to provide a method by which a foreign language can be learned by building an active foreign language alphabet and language in a natural way as it is done in user's native language.

It is another object of the present invention to teach users to read first and allow speech to follow.

It is another object of the present invention to provide a learning aid which includes a reading book having a plurality of pages organized into a plurality of sections which are read in an orderly fashion in order to facilitate incremental advancement and masterfulness concerning the learning of a desired foreign language.

It is another object of the present invention to provide a plurality of sections having a first section, a second section, and a plurality of supplemental sections.

It is another object of the present invention to provide first, second, and supplemental sections which are structured in a manner so as to allow the user of the method to quickly understand that specific target letters represent specific source letters.

It is still another object of the present invention to replace native words provided in the first, second, and supplemental sections with target language words being in proper syntax structure.

It is another object of the present invention to group target language words into meaningful word clusters in order to facilitate comprehension.

It is yet another object of the present invention to motivate the student through apperception by providing motion picture videos with closed captioning, thereby facilitating greater success in learning a foreign language.

Briefly described according to one embodiment of the present invention, a method for learning a foreign language using a learning aid is disclosed. The learning aid comprises a reading book or manual having a plurality of pages or sheets organized into a plurality of sections which are read in an orderly fashion in order to facilitate incremental advancement and masterfulness concerning the learning of a target language or desired foreign language.

The plurality of sections comprises a first section comprised of at least one sentence printed with source terms, wherein source terms are defined as individual terms printed in user's native language. The source terms are comprised of source letters, symbols, and/or characters.

Below the at least one sentence of source terms, at least one first replacement sentence is provided. The replacement sentence comprises the at least one sentence, but having each occurrence of a specific single source letter, which appears in each term of the at least one sentence, replaced by a first target letter. The first target letter is a transliteration of the specific single source letter. The present invention allows the user to progress in the building of an active foreign language alphabet in a natural way as it is done in user's native language.

Printed directly below the first replacement sentence(s), an at least one first supplemental sentence is provided, wherein the at least one first supplemental sentence comprises source terms having the single source letter replaced by the first target letter.

The first section is structured in a manner so as to allow the user of the method to quickly understand that the first target letter represents a specific source letter. Replacement of a specific source letter with a specific target letter also facilitates instantaneous recall concerning the source letter/target letter replacement relationship. To enhance this understanding, a plurality of first supplemental sentences may be printed in the first section, wherein first supplemental sentences are separate from each other and arranged adjacently and vertically.

The first section further comprises a first application section following the at least one first supplemental sentences, wherein the application section comprises a plurality of writings in the form of rhymes, poetry, short stories and other literary works, historical documents and the like, and including excerpts therefrom, comprised of prominent compositions. The writings each comprise a number of sentences which include source terms each having all occurrences of the source letter thereof replaced by the first target letter. The source letter corresponds to the same source letter as denoted heretofore in the first section, and the first target letter corresponds to the same first target letter denoted in the first section.

The writings may comprise an excerpt and/or passage, and/or a complete writing or complete literary composition such as *Casey At The Bat*, by Ernest L. Thayer, wherein the source terms therein each having all occurrences of the source letter thereof replaced by the first target letter.

The first section includes a first unit section following the first application section, wherein first unit section comprises a vertical list of short phrases or sentences printed with source terms, denoted as column "A", but having the source letter replaced by the first target letter. Adjacent to column "A", an additional vertical list of short phrases or sentences is provided and denoted as column "B", wherein the phrases are identical in number with respect to phrases or sentences imprinted in column "A" and are horizontally aligned therewith so as to form a corresponding number of rows of text. The short phrases provided in column "B" comprise the target language translations of the sentences provided in column "A". The short phrases provided in column "B" are written so as to follow the syntax structure of the target language. More specifically, the phrases provided in each row under column "B" provide the translations which are written either from left to right or from right to left for each phrase in corresponding adjacent rows. The use of column "B" introduces the user to the proper syntax structure and proper transmutative form concerning the target language. The transmutative form is the literal translation of the native language to the target language, and such form may be a contracted or an expanded writing in comparison to the language being translated, particularly where one language is character-based.

The plurality of sections includes a second section following the first unit section. The second section is comprised of at least one sentence printed with source terms. Below the at least one sentence of source terms, at least one second replacement sentence is provided. The second replacement sentence comprises the at least one sentence, shown printed directly thereabove, but having each occurrence of the first source letter replaced by the first target letter as described in the first section, and having each occurrence of a second source letter replaced by a second target letter.

Printed directly below the second replacement sentence(s), an at least one second supplemental sentence is provided, wherein the at least one second supplemental sentence comprises source terms having the first source letter replaced by the first target letter, and having the second source letter replaced by the second target letter.

The second section is structured in a manner so as to allow the user of the method to quickly understand that the first target letter represents the first source letter, and that the second target letter represents the second source letter. Thus, to the user, once it is understood that specific target letters represent specific source letters, the user can quickly and easily read terms with source letters replaced by target letters.

The second section further comprises a second application section following the at least one second supplemental sentence, wherein the second application section comprises a plurality of writings in the form of rhymes, poetry, short stories and other literary works, historical documents and the like, and including excerpts therefrom, comprised of prominent compositions. The writings each comprise a number of sentences which include source terms each having all occurrences of the first source letter thereof replaced by the first target letter, and all occurrences of the second source letter thereof replaced by the second target letter. The writings may comprise an excerpt and/or passage, and/or a complete writing or complete literary composition such as *Casey At The Bat*, by Ernest L. Thayer, wherein the source terms therein each having all occurrences of the first source letter thereof replaced by the first target letter, and all occurrences of the second source letter thereof replaced by the second target letter.

The second section includes a second unit section following the second application section, wherein second unit section comprises a vertical list of short phrases or sentences printed with source terms, denoted as column "A", but having the first source letter and second source letter thereof replaced by the first target letter and second target letter, respectively. Adjacent to column "A", an additional vertical list of short phrases or sentences is provided and denoted as column "B", wherein the phrases are identical in number with respect to phrases or sentences imprinted in column "A" and are horizontally aligned therewith so as to form a corresponding number of rows of text. The short phrases provided in column "B" comprise the target language translations of the sentences provided in column "A". The short phrases provided in column "B" are written so as to follow the syntax structure of the target language. More specifically, the phrases provided in each row under column "B" provide the translations which are written either from left to right or from right to left for each phrase in corresponding adjacent rows. Like column "B" in the first section, the use of column "B" in the second section introduces the user to the proper syntax structure and proper transmutative form concerning the target language.

The plurality of sections further comprises a plurality of supplemental sections comprised of target letters which are introduced incrementally with respect to each successive supplemental section. More specifically, an additional, undisclosed target letter is introduced into each succeeding supplemental section in a progressive manner, whereby the total number of target letters increases incrementally within each successive supplemental section. Thus, the plurality of supplemental sections are written in a manner so as to correspond with the progressional pattern concerning the addition of target letters as described hereinabove with respect to the first section and the second section.

Like the first section and the second section, the supplemental sections each includes at least one replacement sentence having each occurrence of source letters therein replaced by their corresponding target letters.

In addition, the supplemental sections each comprises: at least one second supplemental sentence printed directly below the at least one replacement sentence; an application section following the at least one supplemental sentence; and a unit section following the application section. The at least one replacement sentence, the at least one second supplemental sentence, the application section, and the unit section comprising each of the supplemental sections comprise the progressive format as described in detail above with respect to the same provided in the first section and second section regarding the incremental addition of target letters to each succeeding section. More specifically, an additional, undisclosed target letter is introduced into each succeeding supplemental section in a progressive manner, whereby the total number of target letters increases incrementally within each successive supplemental section.

Upon completion of the supplemental sections, target language words in proper syntax structure are slowly substituted to replace words provided in the group which includes the at least one replacement sentences, the at least one second supplemental sentences, the application sections, and the unit sections comprising the reading book.

Once user is familiarized with target language words, target language words are grouped into meaningful word clusters in order to facilitate comprehension. In order to motivate the student through apperception so as to facilitate greater success in learning a foreign language, motion picture videos with closed captioning are included. By appealing to a student's interest in particular movies or motion picture videos, implementation of the present invention becomes less arduous, thereby considerably enhancing the ability and probability of learning a desired foreign language. As the video plays, the audible speech or sounds of the video are silenced and text captions are concurrently displayed transcribing the silenced speech intermittently throughout the duration or length of the video. The text captions comprise at least one first replacement sentence, at least one second replacement sentence, and a plurality of supplemental sections which includes a plurality of auxiliary replacement sentences. The replacement sentences utilized in the text captions comprise target letters which are introduced incrementally with respect to each successive section of replacement sentences as the video progresses. The target letters replace corresponding source letters. More specifically, an additional, undisclosed target letter is introduced into each succeeding replacement sentence in a progressive manner, whereby the total number of target letters increases incrementally within each successive replacement sentence. Thus, the plurality of replacement sentences are written in a manner so as to correspond with the progressional pattern concerning the addition of target letters as described earlier above with respect to the at least one first replacement sentence and the at least one second replacement sentence.

In accordance another embodiment of the present invention, an interactive-based, task-oriented system for learning a foreign language is disclosed. The system includes applications software storable on a computer and adapted for processing thereby. The applications software comprises a control module comprising a game program adapted and configured to allow users thereof to advance through a plurality of levels, wherein each level includes at least one clue and at least one challenge.

The use of the present invention allows for a foreign language to be learned in a quick, easy, and efficient manner.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 5 is a sample illustration of the first section of the learning aid showing the first unit section thereof;

DESCRIPTION OF THE PREFERRED EMBODIMENT

Detailed Description of the Figures

Referring now to FIGS. 1-10, a method for learning a foreign language using a universal learning aid 10 is disclosed and described in accordance with the present invention. The learning aid 10 comprises a reading book 12 or manual having a plurality of pages 14 or sheets organized into a plurality of sections 16 which are read in an orderly fashion in order to facilitate incremental advancement and masterfulness concerning the learning of a target language 18 or desired foreign language, which, in the example provided in FIG. 5, are Hebrew terms.

Figure 1:
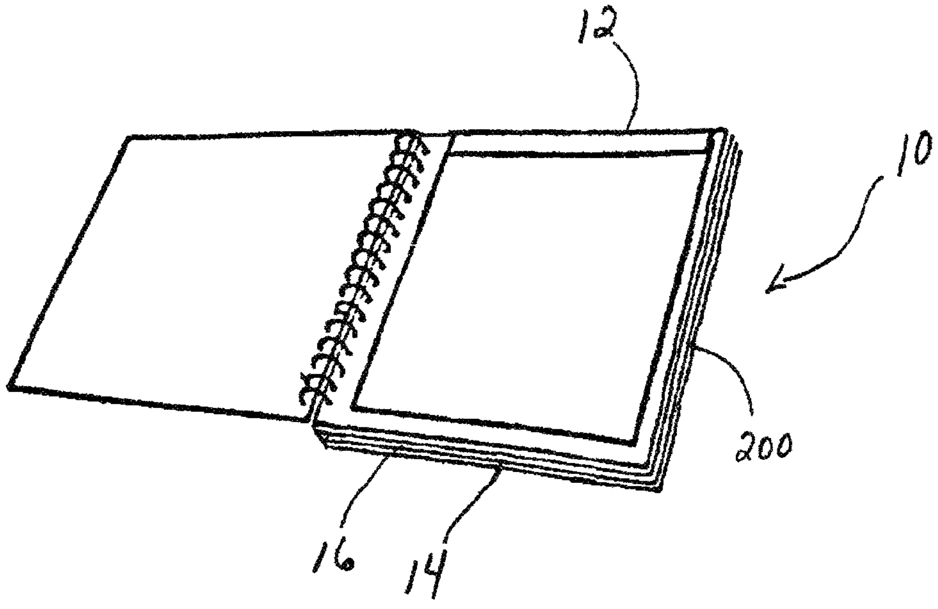
FIG. 1 is a perspective view of the learning aid, according to the preferred embodiment of the present invention.
Figure 2:
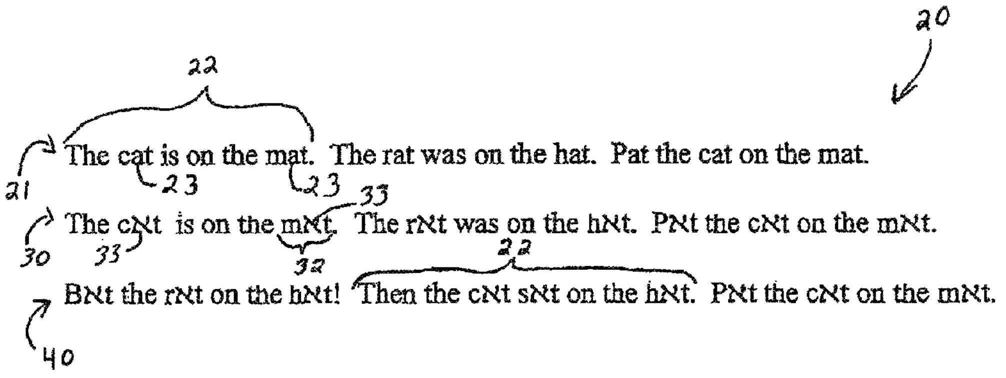
FIG. 2 is a sample illustration of the first section of the learning aid showing sentences with source terms, first replacement sentences, and first supplemental sentences.
Figure 3:
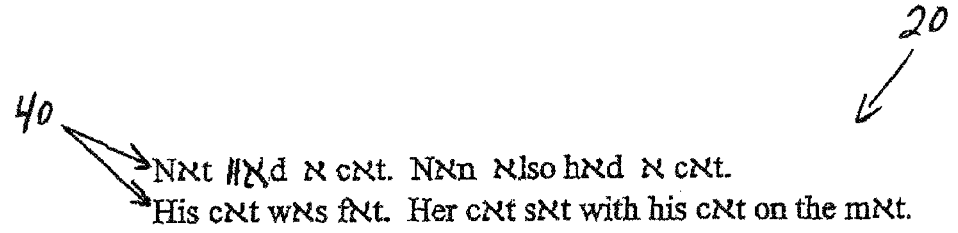
FIG. 3 is a sample illustration of the first section of the learning aid showing a plurality of first supplemental sentences.

Referring more specifically to FIG. 2, the plurality of sections 16 comprises a first section 20 comprised of at least one sentence 21 printed with source terms 22. Source terms 22 are defined as individual terms printed in user's or student's native language and may include but are not limited to nouns, pronouns, adjectives, verbs, adverbs, pronouns, prepositions, and the like. The source terms 22 are comprised of source letters, symbols, scripts, and/or characters 23. The source terms 22 illustrated in FIG. 2 are English terms. Below the at least one sentence 21 of source terms 22, at least one first replacement sentence 30 is provided. The replacement sentence 30 comprises the at least one sentence 21, shown printed directly thereabove, but having each occurrence of a specific single source letter 23, which appears in each term 22 of the at least one sentence 21, replaced by a first target letter 33. The first target letter 33 is a transliteration of the specific single source letter 23. To illustrate, examples provided in FIG. 2, namely, "The cat is on the mat.", "The rat was on the hat.", and "Pat the cat on the mat." demonstrate the at least one sentence 21 printed with source terms 22. The at least one sentence 21 illustrated in FIG. 2 is shown as being three in number and adjacently aligned. Located directly below each of the at least one sentence 21, the first replacement sentences 30 illustrate that the letter "a" or source letter 23 in each term 32 thereof has been replaced by the first target letter 33, namely, " "א". ". In addition, the first replacement sentences 30 correspond in number and alignment with the number of the at least one sentence 21 printed directly thereabove. The first replacement sentences 30 are shown in FIG. 2 as being three in number.

The present invention allows the user/student to progress in the building of an active foreign language alphabet in a natural way as it is done in user's native language.

Printed directly below the first replacement sentence(s) 30, an at least one first supplemental sentence 40 is provided, wherein the at least one first supplemental sentence 40 comprises source terms 22 having the single source letter 23, namely "a" in this particular example, replaced by the first target letter 33, namely " "א" " also in this particular example. For purposes of illustration only, three at least one first supplemental sentences 40 are provided in FIG. 2, wherein the first thereof includes "Bא t the rא t on the hא t!".

The first section 20 is structured in a manner so as to allow the user of the method 10 to quickly understand that the first target letter 33 represents a specific source letter 23. Replacement of a specific source letter 23 with a specific target letter 33 as described in accordance with the aforementioned manner also facilitates instantaneous recall concerning the source letter 23/target letter 33 replacement relationship. To enhance this understanding, a plurality of first supplemental sentences 40 may be printed in the first section 20, wherein first supplemental sentences 40 are separate from each other and arranged adjacently and vertically, as shown by the examples provided in FIG. 3.

Figure 4:
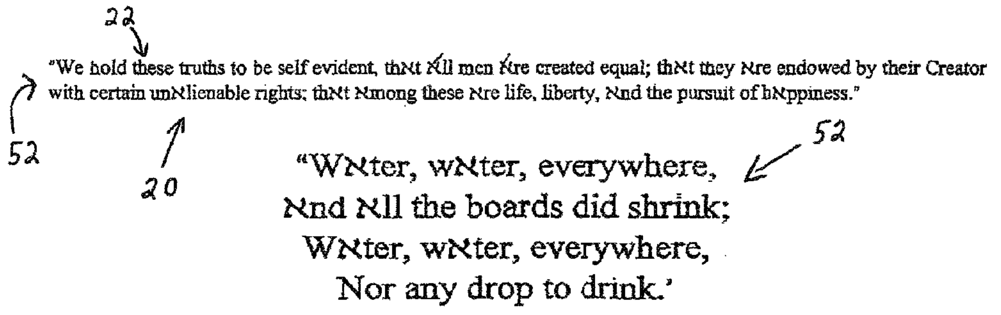
FIG. 4 is a sample illustration of the first section of the learning aid showing the first application section thereof.

Referring now to FIG. 4, the first section 20 further comprises a first application section 50 following the at least one first supplemental sentences 40, wherein the application section 50 comprises a plurality of writings 52, in the form of rhymes, poetry, short stories and other literary works, historical documents and the like, and including excerpts therefrom, comprised of prominent compositions. The writings 52 each comprises a number of sentences which include source terms 22 each having all occurrences of the source letter 23 thereof replaced by the first target letter 33. The source letter 23 corresponds to the same source letter 23 as denoted heretofore in the first section 20, and the first target letter 33 corresponds to the same first target letter 33 denoted in the first section 20. FIG. 4 illustrates two writings 52. The uppermost writing 52 includes an excerpt from *The Declaration of Independence*, wherein the excerpt provides as follows: "We hold these truths to be self evident, thא t א ll men א re crested equ א l; thא t they א re endowed by their Crא ator with certא in un א lienable rights; thא t א mong these א re life, liberty, א nd the pursuit of hא ppiness."

The writing 52 provided directly hereinbelow includes a passage from *The Rime of the Ancient Mariner*, by Samuel Taylor Coleridge, wherein such passage provides as follows: "Wא ter, wא ter, everywhere, א nd א ll the boא rds did shrink; Wא ter, wא ter, everywhere, Nor א ny drop to drink." While the two writings 52 illustrate an excerpt and a passage respectively, the writings 52 may comprise a complete writing or complete literary composition such as *Casey At The Bat*, by Ernest L. Thayer, wherein the source terms 22 therein each having all occurrences of the source letter 23 thereof replaced by the first target letter 33.

Referring now to FIG. 5, the first section 20 includes a first unit section 60 following the first application section 50, wherein first unit section 60 comprises a vertical list of short phrases or sentences 21 printed with source terms 22, denoted as column "A", but having the source letter 23 replaced by the first target letter 33. Adjacent to column "A", an additional vertical list of short phrases or sentences 68 is provided and denoted as column "B", wherein the phrases 68 are identical in number with respect to phrases or sentences 21 imprinted in column "A" and are horizontally aligned therewith so as to form a corresponding number of rows of text. The short phrases 68 provided in column "B" comprise the target language 18 translations of the sentences 21 provided in column "A". The short phrases 68 provided in column "B" are written so as to follow the syntax structure of the target language 18. More specifically, the phrases 68 provided in each row under column "B" provide the translations which are written either from left to right or from right to left for each phrase 21 in corresponding adjacent rows. The determination as to whether each phrase 68 under column "B" is written left to right or right to left is dependent upon the natural direction in which the target language 18 is written. The phrases 68 shown printed in column "B" comprise Hebrew text and are therefore written right to left. To further illustrate, the following phrase is provided in the first row under column "A" in FIG. 5: "O Lord, my God,". The translation of this phrase 21 from the native language (herein shown as English for purposes of example only) to the target language 18 (herein shown as Hebrew for purposes of example only) following proper syntax structure is provided in column "B", which provides in relevant part, "יאל, יאל". Column "A" and column "B" may be separated by an elongated vertical line 66 imprinted on the page 14 thereof. The use of column "B" introduces the user to the proper syntax structure and proper transmutative form concerning the target language 18. The transmutative form is the literal translation of the native language to the target language 18, and such form may be a contracted or an expanded writing in comparison to the language being translated, particularly where one language is character-based. For example, generally, text written in Hebrew is written without vowels.

Figure 6:
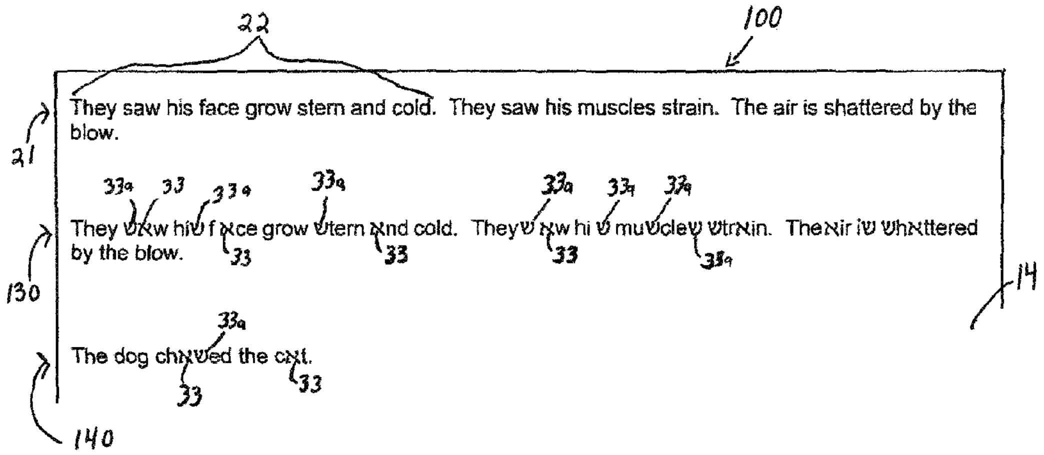
FIG. 6 is a sample illustration of the second section of the learning aid showing sentences with source terms, second replacement sentences, and second supplemental sentences.
Figure 7:
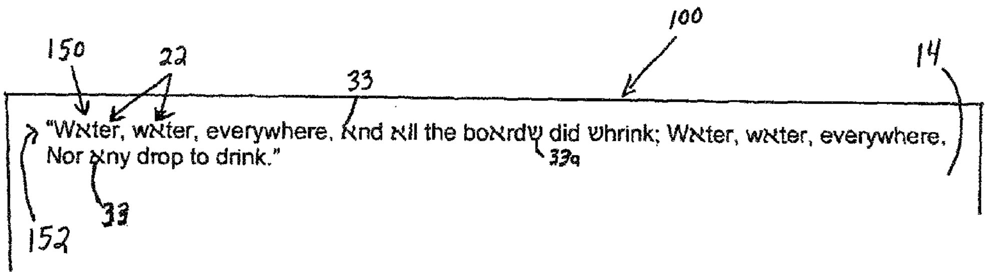
FIG. 7 is a sample illustration of the second section of the learning aid showing the second application section thereof.
Figure 8:
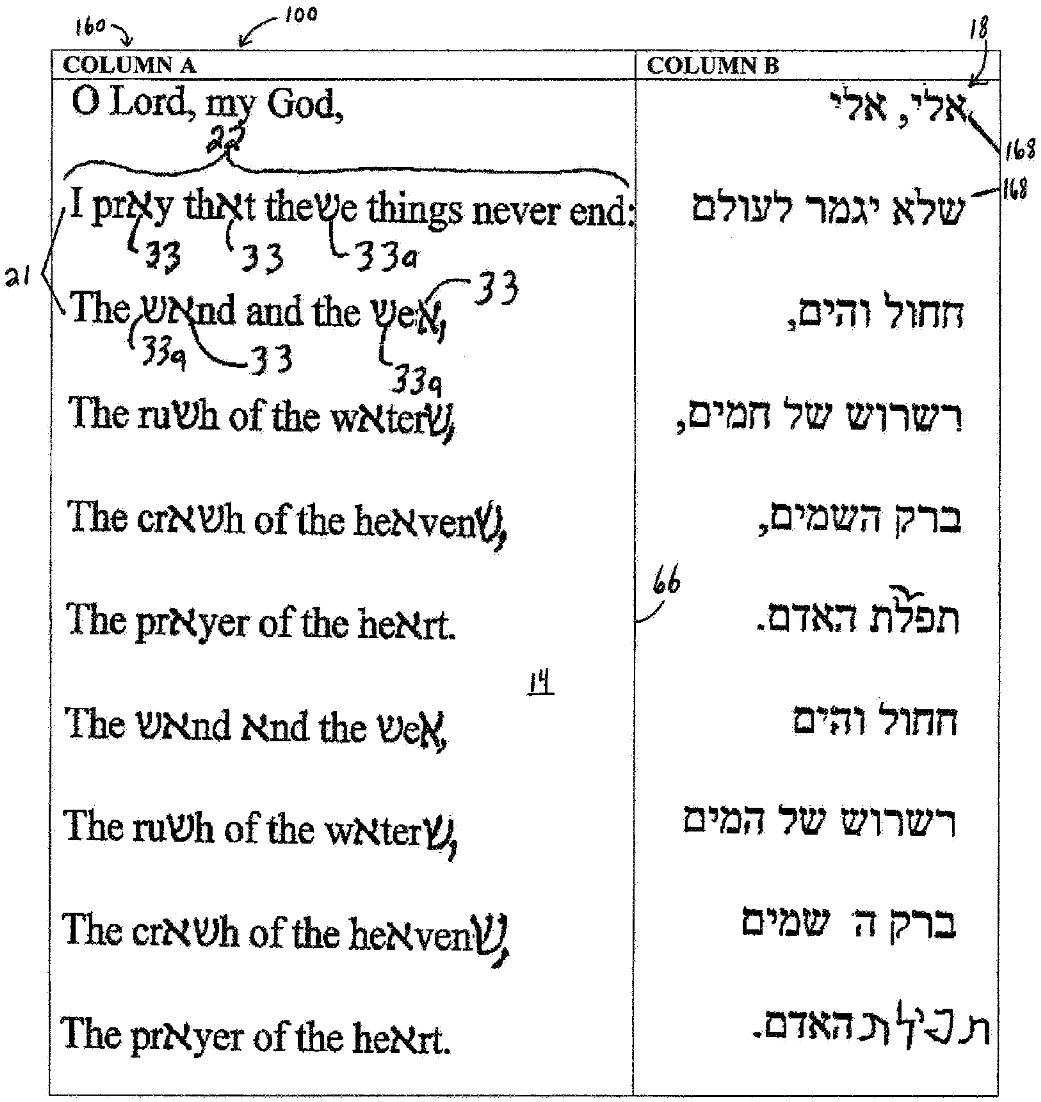
FIG. 8 is a sample illustration of the second section of the learning aid showing the second unit section thereof.
Figure 9:
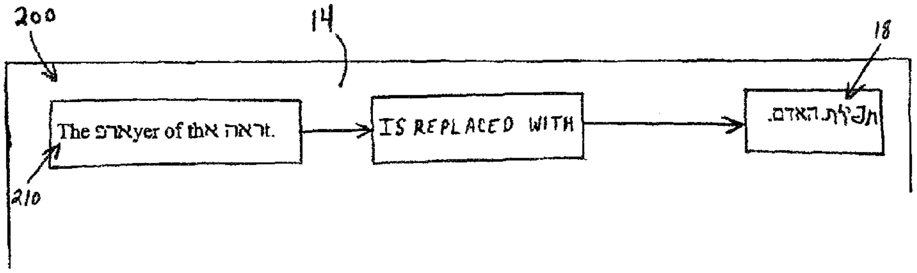
FIG. 9 is a sample illustration of a supplemental section of the learning aid showing a group of words being replaced with target language words which are in proper syntax structure.

Referring now to FIGS. 6-8, the plurality of sections 16 includes a second section 100 following the first unit section 60. The second section 100 is comprised of at least one sentence 21 printed with source terms 22. Below the at least one sentence 21 of source terms 22, at least one second replacement sentence 130 is provided. The second replacement sentence 130 comprises the at least one sentence 21, shown printed directly thereabove, but having each occurrence of the first source letter 23 replaced by the first target letter 33 as described in the first section 20, and having each occurrence of a second source letter 23*a* replaced by a second target letter 33*a*. To illustrate, examples provided in FIG. 6, namely, "They saw his face grow stern and cold.", "They saw his muscles strain.", and "The air is shattered by the blow." demonstrate the at least one sentence 21 printed with source terms 22. The at least one sentence 21 illustrated in FIG. 6 is shown as being three in number and adjacently aligned. Located directly below the at least one sentence 21, the second replacement sentences 130 illustrate that the letter "a" or first source letter 23 in each term 132 thereof has been replaced by the first target letter 33, namely, "א", and the letter "s" or second source letter 23*a* in each term 132 thereof has been replaced by the second target letter 33*a*, namely, "ש". The first target letter and the second target letter are transliterations of the first source letter and the second source letter, respectively. The second replacement sentences 130 correspond in number and alignment with the number of the at least one sentence 21 printed directly thereabove. The second replacement sentences 130 are shown in FIG. 6 as being three in number.

Printed directly below the second replacement sentence(s) 130, an at least one second supplemental sentence 140 is provided, wherein the at least one second supplemental sentence 140 comprises source terms 22 having the first source letter 23, namely "a" in this particular example, replaced by the first target letter 33, namely "א", and having the second source letter 23*a*, namely "s" replaced by the second target letter 33*a*, namely "א". For purposes of illustration, only one second supplemental sentence 140 is depicted in FIG. 6, which provides: "The dog chאש ed the cא t."

The second section 100 is structured in a manner so as to allow the user of the method 10 to quickly understand that the first target letter 33 represents the first source letter 23, and that the second target letter 33*a* represents the second source letter 23*a*. Thus, to the user, once it is understood that specific target letters 33, 33*a* represent specific source letters 23, 23*a*, the user can quickly and easily read terms with source letters 23, 23*a* replaced by target letters 33, 33*a*.

Referring now more specifically to FIG. 7, the second section 100 further comprises a second application section 150 following the at least one second supplemental sentence 140, wherein the second application section 150 comprises a plurality of writings 152 in the form of rhymes, poetry, short stories and other literary works, historical documents and the like, and including excerpts therefrom, comprised of prominent compositions. The writings 152 each comprise a number of sentences which include source terms 22 each having all occurrences of the first source letter 23 thereof replaced by the first target letter 33, and all occurrences of the second source letter 23*a* thereof replaced by the second target letter 33*a*. An example of the plurality of writings 152 is provided in FIG. 7, which includes a passage from *The Rime of the ancient Mariner*, wherein such passage provides as follows: "Wא ter, water, everywhere, א nd א ll the boא rdש did ש hrink; W א ter, wא ter, everywhere, Nor א ny drop to drink."

The plurality of writings 152 are envisioned to comprise a complete writing or complete literary composition such as *Casey At The Bat*, wherein the source terms 22 therein each having all occurrences of the first source letter 23 and the second source letter 23*a* thereof replaced by the first target letter 33 and the second target letter 33*a*, respectively.

Referring now more specifically to FIG. 8, the second section 100 includes a second unit section 160 following the second application section 150, wherein second unit section 160 comprises a vertical list of short phrases or sentences 21 printed with source terms 22, denoted as column "A", but having the first source letter 23 and second source letter 23*a* thereof replaced by the first target letter 33 and second target letter 33*a*, respectively. Adjacent to column "A", an additional vertical list of short phrases or sentences 168 is provided and denoted as column "B", wherein the phrases 168 are identical in number with respect to phrases or sentences 21 imprinted in column "A" and are horizontally aligned therewith so as to form a corresponding number of rows of text. The short phrases 168 provided in column "B" comprise the target language 18 translations of the sentences 21 provided in column "A". The short phrases 168 provided in column "B" are written so as to follow the syntax structure of the target language 18. More specifically, the phrases 168 provided in each row under column "B" provide the translations which are written either from left to right or from right to left for each phrase 21 in corresponding adjacent rows. The determination as to whether each phrase 168 under column "B" is written left to right or right to left is dependent upon the natural direction in which the target language 18 is written. The phrases 168 shown printed in column "B" comprise Hebrew text and are therefore written right to left. To further illustrate, the following phrase is provided in FIG. 8, second row under column "A": "I prא y thא t theש e thingש never end:". The translation of this phrase 21 from the native language (herein shown primarily as English for purposes of example only) to the target language 18 (herein shown as Hebrew for purposes of example only) following proper syntax structure is provided in column "B", which provides in relevant part, "שלא יגדמ לעולם". Column "A" and column "B" may be separated by an elongated vertical line 66 imprinted on the page 14 thereof. Like column "B" in the first section 20, the use of column "B" in the second section 100 introduces the user to the proper syntax structure and proper transmutative form concerning the target language 18.

The plurality of sections 16 further comprises a plurality of supplemental sections 200 comprised of target letters which are introduced incrementally with respect to each successive supplemental section. More specifically, an additional, undisclosed target letter is introduced into each succeeding supplemental section 200 in a progressive manner, whereby the total number of target letters increases incrementally within each successive supplemental section 200. Thus, the plurality of supplemental sections 200 are written in a manner so as to correspond with the progressional pattern concerning the addition of target letters as described hereinabove with respect to the first section 20 and the second section 100.

Like the first section 20 and the second section 100, the supplemental sections 200 each includes at least one replacement sentence having each occurrence of source letters therein replaced by their corresponding target letters.

In addition, the supplemental sections 200 each comprises: at least one supplemental sentence printed directly below the at least one replacement sentence; an application section following the at least one supplemental sentence; and a unit section following the application section. The at least one replacement sentence, the at least one supplemental sentence, the application section, and the unit section comprising each of the supplemental sections 200 comprise the progressive format as described in detail above with respect to the same provided in the first section 20 and second section 100 regarding the incremental addition of target letters to each succeeding section. More specifically, an additional, undisclosed target letter is introduced into each succeeding supplemental section 200 in a progressive manner, whereby the total number of target letters increases incrementally within each successive supplemental section 200.

Upon completion of the supplemental sections 200, target language 18 words in proper syntax structure are slowly substituted to replace words 210, phrases, or sentences provided in the group which includes the at least one replacement sentences, the at least one supplemental sentences, the application sections, and the unit sections comprising the reading book 12. An example of such substitution is provided in FIG. 9.

Figure 10:
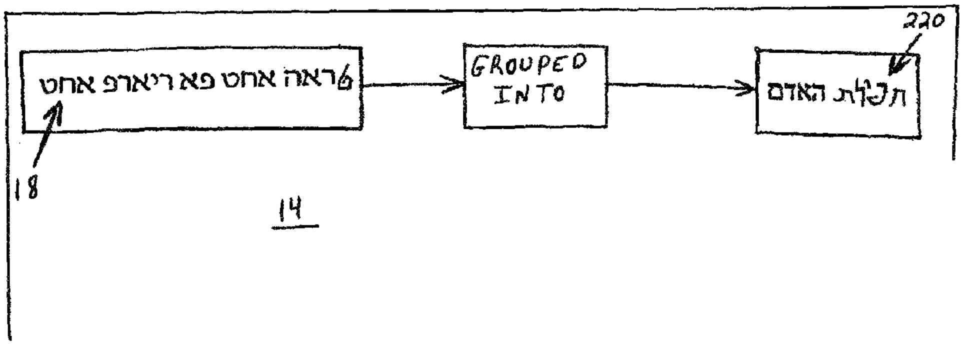
FIG. 10 is a sample illustration of the learning aid showing target language words grouped into meaningful word clusters.

Referring now to FIG. 10, once user is familiarized with target language 18 words, target language 18 words are grouped into meaningful word clusters 220 in order to facilitate comprehension.

Figure 11:
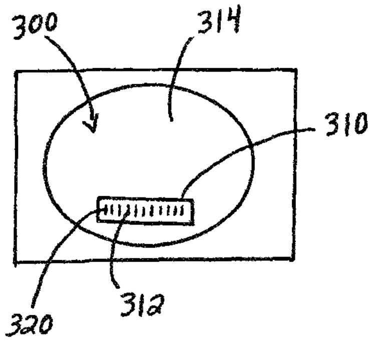
FIG. 11 is side elevational view of a motion picture video with closed captioning shown displayed on a television screen.

Finally, referring to FIG. 11, in order to motivate the student through apperception so as to facilitate greater success in learning a foreign language, motion picture videos 300 with closed captioning 310 are augmented. The motion picture videos 300 are envisioned to be available in various media, i.e., Digital Video Disc (DVD) and Video Home System (VHS). By appealing to a user's interest in particular movies or motion picture videos 300, implementation of the method 10 becomes less arduous, thereby considerably enhancing the ability and probability of learning a desired foreign language. Motion picture videos 300 with closed captioning 310 are envisioned to include movies such as "A Raison in the Sun", "Spider-Man", "Old Yeller", and "The Old Man and the Sea". As the video 300 plays, text captions 312 are displayed on a television screen 314 that transcribe the audio portion, such as speech and often other relevant sounds of the video 300 in the manner as to be described hereinbelow.

In the course of video 300 play, the audible speech or sounds of the video 300 are silenced and text captions 312 are concurrently displayed transcribing the silenced speech intermittently throughout the duration or length of the video 300. For example, the speech or sounds of the video 300 may be silenced and text captions 312 displayed at ten minute intervals. The text captions 312 comprise at least one first replacement sentence 30, at least one second replacement sentence 130, and a plurality of supplemental sections 200 which includes a plurality of replacement sentences 320 according to the method 10 for learning a foreign language as described earlier above. The replacement sentences 320 comprise target letters introduced incrementally with respect to each successive supplemental section 200 as the video 300 progresses. The target letters replace corresponding source letters. More specifically, an additional, undisclosed target letter is introduced into each succeeding replacement sentence 320 in a progressive manner, whereby the total number of target letters increases incrementally within each successive replacement sentence 320. Thus, the plurality of replacement sentences 320 are written in a manner so as to correspond with the progressional pattern concerning the addition of target letters as described earlier above with respect to the at least one first replacement sentence 30 and the at least one second replacement sentence 130.

Referring now more particularly to FIGS. 12-17, in accordance to at least one embodiment of the present invention, the learning aid 10 is configured as an interactive-based, task-oriented system 400. The interactive-based, task-oriented system 400, hereinafter "system 400", may be enabled using a hardware implementation such as the computer hardware environment illustrated in FIG. 12.

Figure 12:
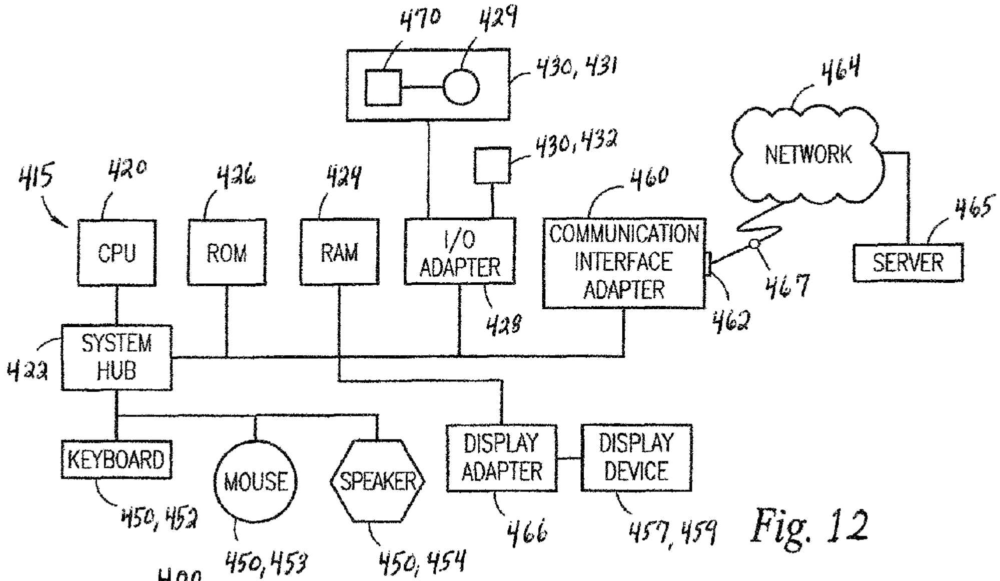
FIG. 12 is a schematic diagram of a computer hardware environment in accordance to one embodiment of the present invention.

The representative computer hardware environment in accordance to one embodiment of the present invention, and as depicted in FIG. 12, illustrates a typical hardware configuration of a computer 415 or workstation having a central processing unit (CPU) 420, and a number of other units interconnected via a system hub 422. The computer 415 includes Random Access Memory (RAM) 424, Read Only Memory (ROM) 426, and an input/output (I/O) adapter 428 for connecting peripheral devices such as storage devices 430 to the system hub 422. The storage devices 430 include a hard disk 431 and at least one portable storage device 432, such as a digital video disc (DVD) and a USB flash drive. An operating system 429, such as but not limited to, DOS, OS/2, Windows®, Macintosh®, and Linux, is installed onto the storage device 30 (hard disk 31) for recall and interaction with the CPU 420. Applications software 470 is installed onto storage device 430 and connected to operating system 429. The applications software 470 comprising two general classes which include systems software and applications software. Systems software comprises low-level programs that interact with the computer 415 at a very basic level, the low-level programs include operating systems, compilers, debuggers, assemblers, file management tools, and utilities for managing computer resources. In contrast, applications software, or "end-user programs" includes database programs, word processors, spreadsheets, graphics generators, communications, and games.

User interface devices 450, such as a keyboard 452, mouse 453, and speaker 454 are connected to system hub 422, such as via a user interface adapter. User interface devices 450 may further include a touch screen 494.

Figure 13:
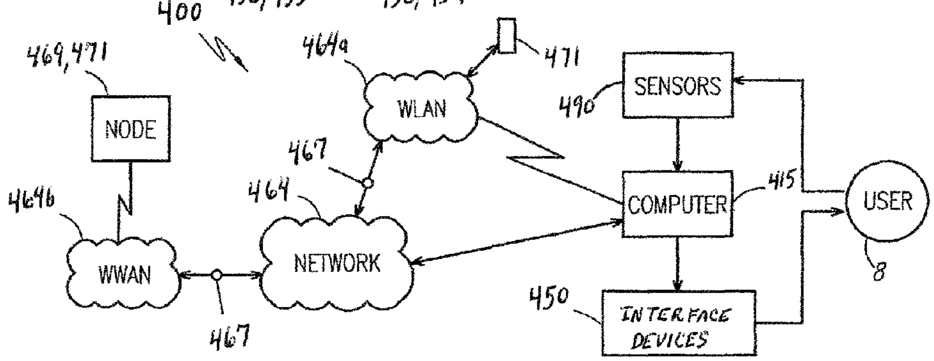
FIG. 13 is a schematic diagram of one possible configuration of the system as described in the description below.
Figure 14:
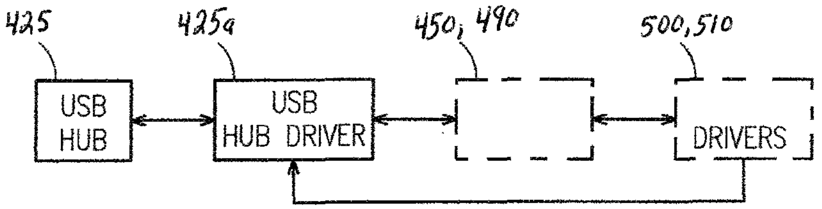
FIG. 14 is a block diagram of a portion of the interactive-based, task-oriented system for learning a foreign language illustrating a means for connecting sensors and user interface devices to the computer of the system, in accordance to one embodiment thereof.
Figure 15:
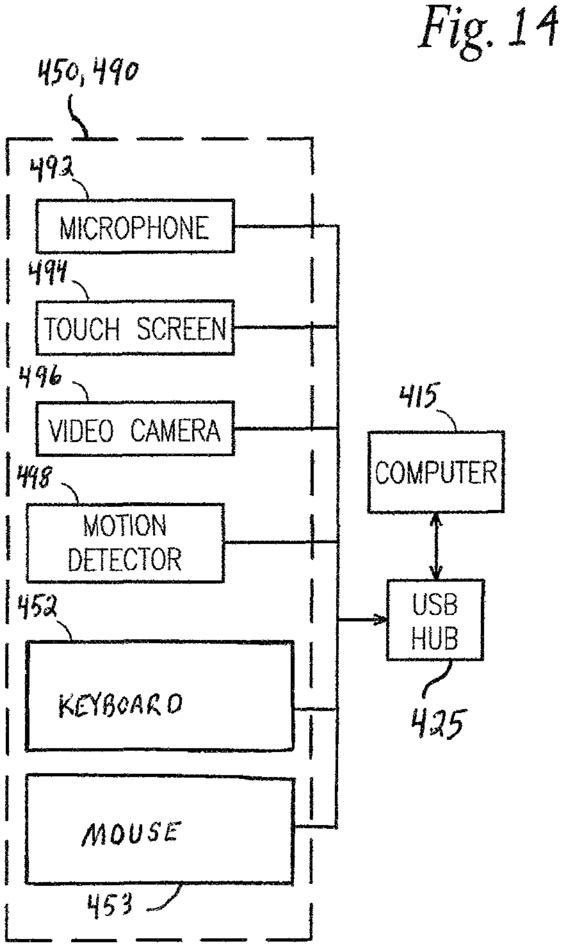
FIG. 15 is a block diagram of a portion of the interactive-based, task-oriented system for learning a foreign language illustrating a plurality of sensors and user interface devices, in accordance to one embodiment of the present invention.
Figure 16:
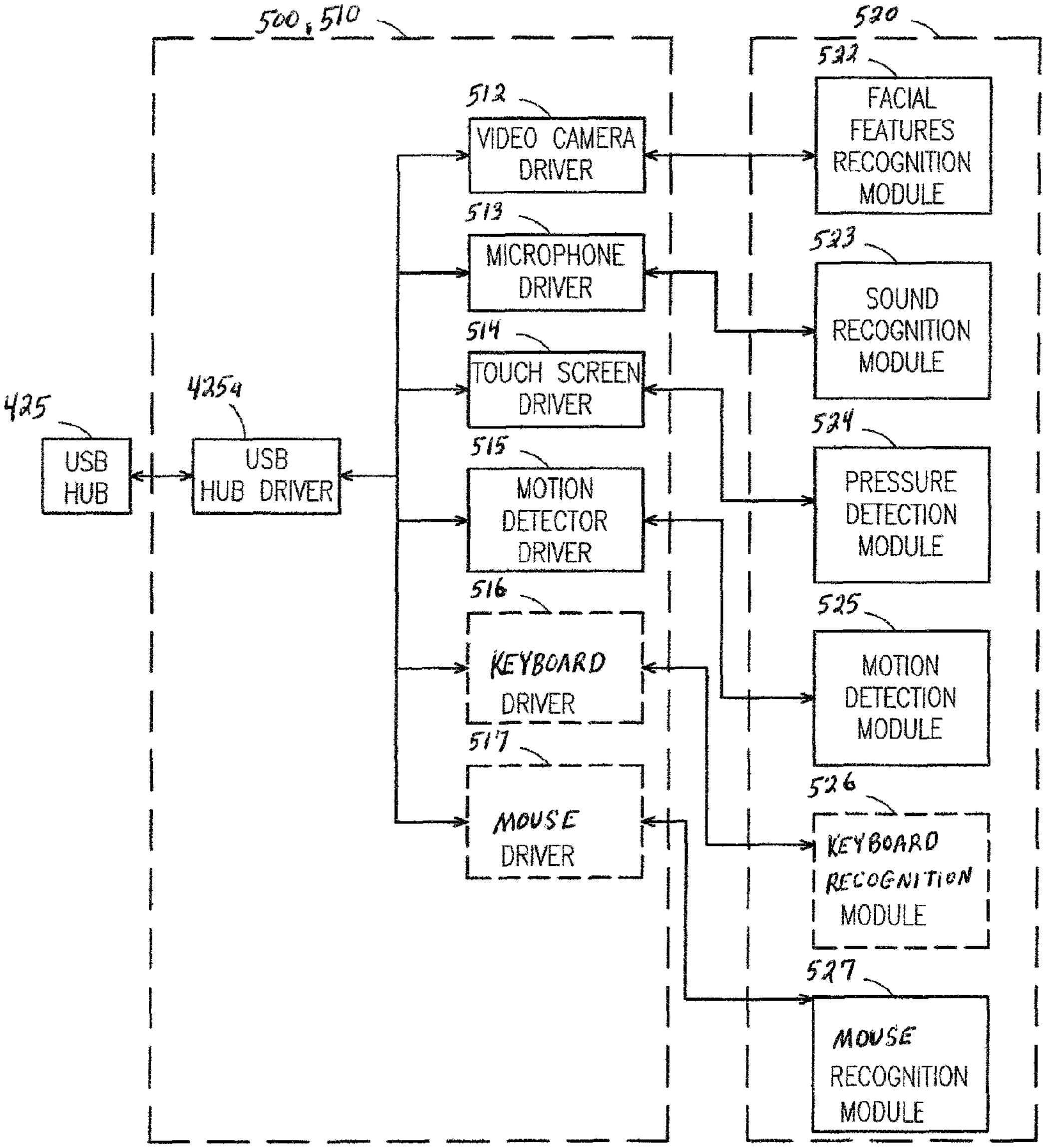
FIG. 16 is a block diagram of a portion of the interactive-based, task-oriented system illustrating a plurality of sensor and user interface drivers and respective software modules, in accordance to one embodiment of the present invention.
Figure 17:
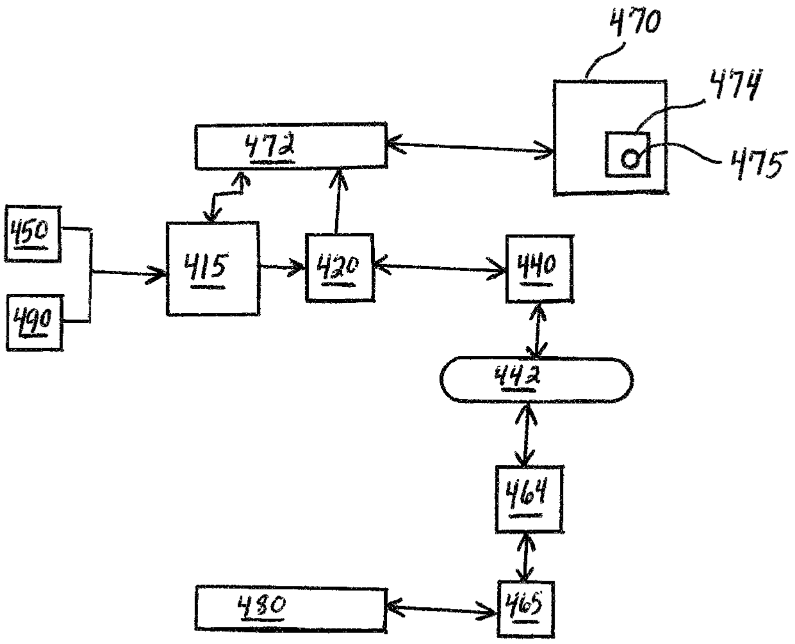
FIG. 17 is a block diagram of a portion of the interactive-based, task-oriented system illustrating an exemplary hardware platform integrated with a control module, in accordance to one embodiment of the present invention.

Referring now to FIGS. 12-13, and 15, the computer 415 further includes a communication interface adapter 460 for connecting the computer 415 to a communication network 464 (e.g., a data processing network database) and a display adapter 466 for connecting the system hub 422 to a display device 457, such as a touch screen 494, or a display panel 459, wherein display panel 459 may include, but is not limited to a liquid crystal display (LCD) display panel or a light-emitting diode (LED) display panel. The communication interface adapter 460 may comprise a wireless communication connection 462, such as a wireless local-area network (WLAN) *464a*, a wireless wide-area network (WWAN) *464b*, and/or a wireless personal area network (WPAN) to facilitate wireless communication between nodes 469 (FIG. 13), the system 400 network database 464, and at least one remote server 465, wherein a node 469 being another computer or some other device, such as a printer and/or a mobile electronic device 471. Mobile electronic device 471 includes, but is not limited to a cellular phone, such as BlackBerry®, iPhone®, Android™, personal digital assistant (PDA), tablet device, such as iPad®, and the like. WPAN may utilize, e.g., Bluetooth® which allows the transmission of data between Bluetooth®-compatible devices such as cellular phones, computers, portable data terminals and bar code printers or scanners.

The system 400 of the present invention preferably includes an encryption algorithm 467 for preventing unauthorized access to the network 464 database, and particularly the server 465, by third parties.

The server 465 includes a network storage system 480 (FIG. 17) for maintaining copies of digital data across the communication interface 460 connections, such as high-speed local-area network (LAN), WLAN 464*a*, and WWAN 464*b*. More specifically, the network storage system 480 provides back up for digital data files, databases and other data to the central network 464 which is easily accessed via standard network protocols and tools. The network storage system 480 provides a reliable, external data repository for all computers and nodes 469 on the network 464 to share efficiently. The network storage system 480 may also support automated backup/recovery programs to prevent critical data loss.

The network storage system 480 may comprise a Storage Area Network (SAN) storage or a Network Attached Storage (NAS) storage. SAN storage is typically employed on business networks, the SAN storage utilizing high-end servers, high capacity disk arrays and fibre channel interconnection technology. NAS storage is typically employed on home networks which entails installing NAS devices onto the network (typically LAN) via Transmission Control Protocol/Internet Protocol (TCP/IP). TCP/IP is the suite of communications protocols used to connect hosts on the Internet TCP/IP.

The system 400 is designed to provide one or more users with an interactive game from which various tasks or challenges are required to be successfully completed in order to achieve a desired goal or object of the game. In accordance to one exemplary embodiment, the desired goal or object may comprise locating a hidden treasure. In accordance to another exemplary embodiment, the desired goal or object may comprise locating a parent(s) of the one or more users, wherein the parent(s) is located in a foreign country, preferably, in which the target language 18 desired to be learned is spoken.

The system 400 provides an exciting and entertaining game that facilitates the learning of a foreign language as well as stimulating creativity and imagination. The game includes a plurality of levels which must be completed in sequential order. The plurality of levels each includes at least one clue and at least one challenge. The levels are arranged in order of increasing difficulty, or otherwise progressively increase in difficulty. A first level includes providing one or more users with one or more clues to complete at least one first level challenge. Upon completion of the at least one first level challenge, the one or more users advance to a second level at which the one or more users are provided one or more clues in order to complete at least one second level challenge in the second level of the game. The one or more users continue in this progressive fashion until completing at least one challenge in a final level of the plurality of levels of the game. The one or more users may advance in levels of the game only by completing the corresponding challenges.

In reference to FIGS. 12-17, the computer 415 communicates bi-directionally with system hub 422 and/or a universal serial bus (USB) hub 425 for connecting sensors 490 or detectors which include, but are not limited to a microphone 492, touch screen 494, video camera 496, (e.g., webcam), and motion detector 498.

The computer 415 may further comprise sensor drivers 500 and user interface device drivers 510 corresponding to particular sensors 490 and user interface devices 450, respectively. As previously described, user interface devices 450 include a keyboard 452, mouse 453, speaker 454, and touch screen 494. Sensor drivers include video camera driver 512, microphone driver 513, and motion detector driver 515. User interface device drivers 510 include keyboard driver 516, touch screen driver 514, and mouse driver 517.

The sensor and user interface drivers 500 and 510 communicate with software modules 520, wherein sensor and interface drivers 500 and 510 provide an interface between sensors 490 and user interface devices 450, and the software modules 520. Software modules 520 include a facial features recognition module, sound recognition module 523, pressure detection module 524, motion detection module 525, keyboard stroke recognition module 526, and mouse manipulation recognition module 527.

The software modules 520 recognize and/or process user(s) 8 input(s), and track user(s) 8 input(s). The tracked inputs are then classified as correct or incorrect responses via a response classification algorithm, e.g., sequential vector machine, neural network, etc., resulting in generation of response values indicative of correct or incorrect responses. Classified inputs may be time stamped and transmitted via sensor drivers 500 to the computer 415 which transmits the time stamped, classified inputs to an update algorithm 420.

The update algorithm 420 writes new data records and transmits the new or updated data records to an applications software module 472 and a records database 440. The records database 440 transmits the updated data records to a network synchronization algorithm 442. The synchronization algorithm 442 enables updated data records to be synchronized between the records database 440 and the network storage system 480 (repository) of network 464. The synchronization algorithm 442 compares updated data records logged in the records database 440 with records data (classified user inputs) logged/recorded and stored in the network storage system 480 of server 465.

In further accordance to the present invention, the applications software module 472 connects the applications software 470 to the computer 415, wherein the applications software 470 comprises a control module 474 having a program via users 8 advance through a plurality of levels, wherein each level includes at least one clue and at least one challenge. More specifically, the control module 474 comprises a game program 475, the game program 475 comprising: viewable data having a first section, wherein the first section comprises at least one sentence printed with source terms, wherein the source terms are defined as individual terms printed in user's native language, the source terms comprise source letters, symbols, scripts, and/or characters; at least one first replacement sentence, the at least one first replacement sentence is provided below the at least one sentence of the source terms, the at least one first replacement sentence comprises the at least one sentence having each occurrence of a specific single source letter appearing in each term of the at least one sentence replaced by a first target letter, wherein the first target letter is a transliteration of the specific single source letter, the at least one first replacement sentence corresponds in number and alignment with a number of the at least one sentence; an at least one first supplemental sentence, the at least one first supplemental sentence is printed directly below the at least one first replacement sentence, wherein the at least one first supplemental sentence comprises the source terms having the single source letter replaced by the first target letter; a first application section, the first application section follows the at least one first supplemental sentence, wherein the first application section comprises a plurality of writings comprised of prominent compositions, the plurality of writings is in the form of rhymes, poetry, short stories and other literary works, and historical documents including excerpts therefrom, the plurality of writings each comprises a number of sentences which include the source terms each having all occurrences of the source letter thereof replaced by the first target letter; a first unit section, the first unit section follows the first application section, the first unit section comprises a first vertical list of short phrases or sentences printed with the source terms, the source terms having the source letter replaced by the first target letter, the first unit section further comprises a second vertical list of short phrases or sentences printed adjacent to the first vertical list, wherein the short phrases provided in the second vertical list are identical in number with respect to the short phrases or sentences printed in the first vertical list and the short phrases in the second vertical list are horizontally aligned with the short phrases printed in the first vertical list so as to form a corresponding number of rows of text, the short phrases printed in the second vertical list comprise target language translations of the short phrases printed in the first vertical list, the short phrases printed in the second vertical list are printed in a manner so as to follow a syntax structure of the target language, the short phrases printed in the second vertical list are adapted to introduce a user of the learning aid to a proper syntax structure and proper transmutative form concerning the target language; a second section, wherein the second section comprises at least one sentence printed with the source terms, wherein the source terms are defined as individual terms printed in user's native language, the source terms comprise source letters, symbols, scripts, and/or characters; at least one second replacement sentence, the at least one second replacement sentence is provided below the at least one sentence of the source terms, the at least one second replacement sentence comprises the at least one sentence having each occurrence of the first source letter replaced by the first target letter and having each occurrence of a second source letter replaced by a second target letter, the first target letter and the second target letter are transliterations of the first source letter and the second source letter, respectively, the at least one second replacement sentence corresponds in number and alignment with a number of the at least one sentence of the source terms printed directly thereabove; an at least one second supplemental sentence, the at least one second supplemental sentence is printed directly below the at least one second replacement sentence, the at least one second supplemental sentence comprises the source terms having the first source letter replaced by the first target letter, and having all occurrences of the second source letter replaced by the second target letter; a second application section, the second application section follows the at least one second supplemental sentence, wherein the second application section comprises a plurality of writings comprised of prominent compositions, the plurality of writing is in the form of rhymes, poetry, short stories and other literary works, and historical documents including excerpts therefrom, the plurality of writings each comprises a number of sentences which include the source terms each having all occurrences of the first source letter replaced by the first target letter, and having all occurrences of the second source letter replaced by the second target letter; and a second unit section, the second unit section follows the second application section, the second unit section comprises a first vertical list of short phrases or sentences printed with the source terms, the source terms having the first source letter and the second source letter replaced by the first target letter and the second target letter, respectively, the second unit section further comprises a second vertical list of short phrases or sentences printed adjacent to the first vertical list, wherein the short phrases provided in the second vertical list are identical in number with respect to the short phrases printed in the first vertical list and the short phrases or sentences provided in the second vertical list are horizontally aligned with the short phrases printed in the first vertical list so as to form a corresponding number of rows of text, the short phrases printed in the second vertical list comprise target language translations of the short phrases printed in the first vertical list, the short phrases printed in the second vertical list are printed in a manner so as to follow a syntax structure of the target language, the short phrases printed in the second vertical list are adapted to introduce the user to the proper syntax structure and proper transmutative form concerning the target language; and a plurality of supplemental sections. The plurality of supplemental sections each comprises at least one, undisclosed target letter introduced incrementally with respect to each a successive supplemental section in a manner such that a total number of the target letters increases incrementally within each the successive supplemental section.

The plurality of supplemental sections each comprises at least one sentence printed with the source terms, wherein the source terms are defined as individual terms printed in user's native language, the source terms comprise source letters, symbols, scripts, and/or characters; at least one replacement sentence having each occurrence of source letters replaced by corresponding target letters; at least one supplemental sentence printed directly below the at least one replacement sentence; an application section, the application section follows the at least one supplemental sentence, the application section comprises a plurality of writings in the form of rhymes, poetry, short stories and other literary works, and historical documents, and including excerpts therefrom, comprised of prominent compositions, wherein the plurality of writings each comprises a number of sentences which include a source terms each having all occurrences of a source letter thereof replaced by a first target letter, the source letter corresponds to a same source letter denoted in the first section, and the first target letter corresponds to a same first target letter denoted in the first section; and a unit section following the application section. The unit section comprises a vertical list of short phrases or sentences printed with source terms and provided as a first column, the vertical list of short phrases or sentences having the source letter thereof replaced by the first target letter. The first column having a second column positioned adjacent thereto and below which an additional vertical list of short phrases or sentences is provided, wherein the short phrases or sentences positioned below the second column are identical in number with respect to the short phrases or sentences provided in the first column and are horizontally aligned therewith so as to form a corresponding number of rows of text. The short phrases or sentences provided in the second column comprise the target language translations of the short phrases or sentences provided in the first column. The short phrases or sentences provided in the second column are written so as to follow a syntax structure of the target language. The second application section and the at least one supplemental sentence may each be programmed as a succeeding level, respectively.

The at least one replacement sentence, the at least one second supplemental sentence, the application section, and the unit section are each introduced with an additional, undisclosed target letter in a progressive manner such that a total number of the target letters increases incrementally within each successive supplemental section of the plurality of supplemental sections. The introduction of an additional, undisclosed target letter in a progressive manner is a succeeding level.

The at least one replacement sentence, the at least one second supplemental sentence, the application section, the unit section each comprises words which are replaced with target language words, wherein the target language words are provided in proper syntax structure. The replacement of words with target language words is another succeeding level.

A next succeeding level includes grouping target language words into meaningful word clusters in order to facilitate comprehension.

The source terms include but are not limited to nouns, pronouns, adjectives, verbs, adverbs, pronouns, and prepositions.

The applications software module 172 transmits a signal received by CPU 420 which generates outputs for the user 8 via output converters or user interface devices 450, which convert the outputs for the user 8 from a format, e.g., digital format, into a format perceivable by user 8, such as visual, audible, and/or tactile.

The control module 474 is in communication with user interface devices 450 and sensors 490, wherein the control module 474 is configured to provide certain outputs to activate or control one or more effects, such as advancement to a succeeding level and providing at least one clue, based on user input of correct or incorrect answers or information. The CPU 420 is in communication with both the user interface devices 450 and sensors 490 and the control module 474, wherein the CPU 420 processes user 8 input via the user interface devices 450 and sensors 490, and transmits processed input as data received by the control module 474 which provides an output to control or direct advancement or nonadvancement to a succeeding level.

In accordance to one exemplary embodiment, the microphone 492 detects inputs generated by the user 8 and converts the detected inputs into digital data which is transmitted to a microphone driver 513. The microphone driver 513 provides digital audio via an I/O stream to a sound/voice recognition module 523. The sound recognition module 523 processes the digital audio data and outputs a speech expression value indicative of verbal features and/or characteristics recognized from the user 8. The speech expression value is a mathematical abstraction of user 8 voice features that may be tracked using a suitable sound or voice detection or recognition technique. In accordance to one embodiment, voice features include pitch, speaking rate, frequency, and pauses in speech. Other voice features and/or parameters may also be utilized for calculating voice expression value. A predetermined number of user 8 voice features of the voice signal are extracted and tracked as described above. Thereafter, in accordance to one embodiment, the sound recognition module 523 analyzes, abstracts, and tracks user 8 voice features. The tracked voice features are then classified into particular utterances via an utterance classification algorithm, e.g., sequential vector machine, neural network, etc., resulting in utterance or speech expression values indicative of user 8. The microphone driver 513 provides the speech expression values data to the USB hub driver 425*a* which outputs the voice expression values data to the USB hub 425 for delivery to the CPU 420 which processes the voice expression values data and transmits the processed data to the control module 474 which provides an output to control or direct advancement or non-advancement to a succeeding level. The game program 475 can also be configured for storage on a DVD and made commercially available for upload onto a computer 415.

The use of the present invention allows for a foreign language to be learned in a quick, easy, and efficient manner.

It is envisioned that the various embodiments, as separately disclosed, are interchangeable in various aspects, so that elements of one embodiment may be incorporated into one or more of the other embodiments, and that specific positioning of individual elements may necessitate other arrangements not specifically disclosed to accommodate performance requirements or spatial considerations.

It is to be understood that the embodiments and claims are not limited in its application to the details of construction and arrangement of the components set forth in the description and illustrated in the drawings. Rather, the description and the drawings provide examples of the embodiments envisioned, but the claims are limited to the specific embodiments. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the U.S. Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. An interactive-based, task-oriented system for learning Hebrew language, the system comprising:

a computer, the computer comprises:
- a central processing unit;
- a first memory;
- a second memory;
- at least one storage device;
- a system hub;
- an input/output adapter for connecting the at least one storage device to the system hub;
- an operating system installed onto the at least one storage device for recall and interaction with the central processing unit;
- applications software installed onto the at least one storage device, the applications software is connected to the operating system;
- a communication network, the communication network is defined as a data processing network database comprising at least one server, the server comprises a network storage system;
- a communication interface adapter for connecting the computer to the communication network, the communication interface adapter comprises a wireless communication connection;
- a display device;
- a display adapter for connecting the system hub to the display device;
- means for inputting and detecting data and commands generated by a user;
- a plurality of user interface devices, wherein the computer generates outputs via at least one of the plurality of user interface devices, the plurality of user interface devices converts the computer-generated outputs into a user-perceivable output;

a universal serial bus hub, the computer communicates bi-directionally with the system hub and the universal serial bus hub for connecting the input and detection means, the input and detection means comprises a plurality of sensors;

an encryption algorithm for preventing unauthorized access to the communication network;

software modules, the software modules recognize and process user input(s) and characteristics, track user input(s) and characteristics, and recognize patterns of user input(s) and characteristics;

input and detection means drivers, the input and detection means drivers are connected to corresponding input devices and sensors, the input and detection means drivers communicate with corresponding software modules, wherein the input and detection means drivers providing an interface respectively between the input devices and the sensors, and the software modules; and an applications software module, the applications software module connects the applications software to the central processing unit, the applications software comprises a control module, the control module comprises a game program, the game program comprising:

viewable data having a first section and a second section, the first section comprising:

at least one sentence printed with source terms, wherein the source terms are defined as individual terms printed in user's native language, the source terms comprise source letters, symbols, scripts, and characters;

at least one first replacement sentence, the at least one first replacement sentence is provided below the at least one sentence of the source terms, the at least one first replacement sentence comprises the at least one sentence having each occurrence of a specific single source letter appearing in each term of the at least one sentence replaced by a first Hebrew letter, wherein the first Hebrew letter is a transliteration of the specific single source letter, the at least one first replacement sentence corresponds in number and alignment with a number of the at least one sentence;

an at least one first supplemental sentence, the at least one first supplemental sentence is printed directly below the at least one first replacement sentence, wherein the at least one first supplemental sentence comprises the source terms having the single source letter replaced by the first target letter;

a first application section, the first application section follows the at least one first supplemental sentence, wherein the first application section comprises a plurality of writings comprised of prominent compositions, the plurality of writings is in the form of rhymes, poetry, short stories and other literary works, and historical documents including excerpts therefrom, the plurality of writings each comprises a number of sentences which include the source terms each having all occurrences of the source letter thereof replaced by the first Hebrew letter;

a first unit section, the first unit section follows the first application section, the first unit section comprises a first vertical list of short phrases or sentences printed with the source terms, the source terms having the source letter replaced by the first Hebrew letter, the first unit section further comprises a second vertical list of short phrases or sentences printed adjacent to the first vertical list, wherein the short phrases provided in the second vertical list are identical in number with respect to the short phrases or sentences printed in the first vertical list and the short phrases in the second vertical list are horizontally aligned with the short phrases printed in the first vertical list so as to form a corresponding number of rows of text, the short phrases printed in the second vertical list comprise Hebrew language translations of the short phrases printed in the first vertical list, the short phrases printed in the second vertical list are printed in a manner so as to follow a syntax structure of the target language, the short phrases printed in the second vertical list are adapted to introduce a user of the learning aid to a proper syntax structure and proper transmutative form concerning the Hebrew language; and wherein the second section comprises:

at least one sentence printed with the source terms, wherein the source terms are defined as individual terms printed in user's native language, the source terms comprise source letters, symbols, scripts, and characters;

at least one second replacement sentence, the at least one second replacement sentence is provided below the at least one sentence of the source terms, the at least one second replacement sentence comprises the at least one sentence having each occurrence of the first source letter replaced by the first Hebrew letter and having each occurrence of a second source letter replaced by a second Hebrew letter, the first Hebrew letter and the second Hebrew letter are transliterations of the first source letter and the second source letter, respectively, the at least one second replacement sentence corresponds in number and alignment with a number of the at least one sentence of the source terms printed directly thereabove;

an at least one second supplemental sentence, the at least one second supplemental sentence is printed directly below the at least one second replacement sentence, the at least one second supplemental sentence comprises the source terms having the first source letter replaced by the first Hebrew letter, and having all occurrences of the second source letter replaced by the second Hebrew letter;

a second application section, the second application section follows the at least one second supplemental sentence, wherein the second application section comprises a plurality of writings comprised of prominent compositions, the plurality of writing is in the form of rhymes, poetry, short stories and other literary works, and historical documents including excerpts therefrom, the plurality of writings each comprises a number of sentences which include the source terms each having all occurrences of the first source letter replaced by the first Hebrew letter, and having all occurrences of the second source letter replaced by the second Hebrew letter; and a second unit section, the second unit section follows the second application section, the second unit section comprises a first vertical list of short phrases or sentences printed with the source terms, the source terms having the first source letter and the second source letter replaced by the first target letter and the second target letter, respectively, wherein the target letters are in Hebrew language the second unit section further comprises a second vertical list of short phrases or sentences printed adjacent to the first vertical list, wherein the short phrases provided in the second vertical list are identical in number with respect to the short phrases printed in the first vertical list and the short phrases or sentences provided in the second vertical list are horizontally aligned with the short phrases printed in the first vertical list so as to form a corresponding number of rows of text, the short phrases printed in the second vertical list comprise Hebrew language translations of the short phrases printed in the first vertical list, the short phrases printed in the second vertical list are printed in a manner so as to follow a syntax structure of the Hebrew language, the short phrases printed in the second vertical list are adapted to introduce the user of the learning aid to the proper syntax structure and proper transmutative form concerning the Hebrew language;

and a plurality of supplemental sections.

2. The system of claim 1, wherein the plurality of supplemental sections each comprises at least one, undisclosed Hebrew letter introduced incrementally with respect to each a successive supplemental section in a manner such that a total number of the target letters increases incrementally within each the successive supplemental section.

3. The system of claim 2, wherein the plurality of supplemental sections each comprises:

at least one sentence printed with the source terms, wherein the source terms are defined as individual terms printed in user's native language, the source terms comprise source letters, symbols, scripts, and characters;

at least one replacement sentence having each occurrence of source letters replaced by corresponding target letters wherein the target letters are in Hebrew language;

at least one supplemental sentence printed directly below the at least one replacement sentence;

an application section, the application section follows the at least one supplemental sentence, the application section comprises a plurality of writings in the form of rhymes, poetry, short stories and other literary works, and historical documents, and including excerpts therefrom, comprised of prominent compositions, wherein the plurality of writings each comprises a number of sentences which include a source terms each having all occurrences of a source letter thereof replaced by a first target letter in Hebrew language, the source letter corresponds to a same source letter denoted in the first section, and the first target letter corresponds to a same first target letter denoted in the first section; and a unit section following the application section, the unit section comprises a vertical list of short phrases or sentences printed with source terms and provided as a first column, the vertical list of short phrases or sentences having the source letter thereof replaced by the first Hebrew letter, the first column having a second column positioned adjacent thereto and below which an additional vertical list of short phrases or sentences is provided, wherein the short phrases or sentences positioned below the second column are identical in number with respect to the short phrases or sentences provided in the first column and are horizontally aligned therewith so as to form a corresponding number of rows of text, the short phrases or sentences provided in the second column comprise the Hebrew language translations of the short phrases or sentences provided in the first column, the short phrases or sentences provided in the second column are written so as to follow a syntax structure of the Hebrew language, and wherein the first column and the second column are separated by an elongated vertical line imprinted on a page thereof.

4. The system of claim 3, wherein the at least one replacement sentence, the at least one second supplemental sentence, the application section, and the unit section are each introduced with an additional, undisclosed target letter in a progressive manner wherein the target letter is in Hebrew language such that a total number of the target letters increases incrementally within each successive supplemental section of the plurality of supplemental sections.

5. The system of claim 4, wherein the at least one replacement sentence, the at least one second supplemental sentence, the application section, and the unit section each comprises words which are replaced with target language words, wherein the target language words are in Hebrew and are provided in proper syntax structure.

6. The system of claim 5, wherein the target language words are grouped into meaningful word clusters in order to facilitate comprehension.

7. A learning aid comprising:

a game program storable on a central processing unit, the game program comprising:

a first section and a second section, the first section comprising:

at least one sentence printed with source terms, wherein the source terms are defined as individual terms printed in user's native language, the source terms comprise source letters, symbols, scripts, and characters;

at least one first replacement sentence, the at least one first replacement sentence is provided below the at least one sentence of the source terms, the at least one first replacement sentence comprises the at least one sentence having each occurrence of a specific single source letter appearing in each term of the at least one sentence replaced by a first target letter, wherein the first Hebrew letter in Hebrew is a transliteration of the specific single source letter, the at least one first replacement sentence corresponds in number and alignment with a number of the at least one sentence;

an at least one first supplemental sentence, the at least one first supplemental sentence is printed directly below the at least one first replacement sentence, wherein the at least one first supplemental sentence comprises the source terms having the single source letter replaced by the first Hebrew letter;

a first application section, the first application section follows the at least one first supplemental sentence, wherein the first application section comprises a plurality of writings comprised of prominent compositions, the plurality of writings is in the form of rhymes, poetry, short stories and other literary works, and historical documents including excerpts therefrom, the plurality of writings each comprises a number of sentences which include the source terms each having all occurrences of the source letter thereof replaced by the first target letter in Hebrew language;

a first unit section, the first unit section follows the first application section, the first unit section comprises a first vertical list of short phrases or sentences printed with the source terms, the source terms having the source letter replaced by the first Hebrew letter, the first unit section further comprises a second vertical list of short phrases or sentences printed adjacent to the first vertical list, wherein the short phrases provided in the second vertical list are identical in number with respect to the short phrases or sentences printed in the first vertical list and the short phrases in the second vertical list are horizontally aligned with the short phrases printed in the first vertical list so as to form a corresponding number of rows of text, the short phrases printed in the second vertical list comprise Hebrew language translations of the short phrases printed in the first vertical list, the short phrases printed in the second vertical list are printed in a manner so as to follow a syntax structure of the Hebrew language, the short phrases printed in the second vertical list are adapted to introduce a user of the learning aid to a proper syntax structure and proper transmutative form concerning the Hebrew language;

the second section comprises:

at least one sentence printed with the source terms, wherein the source terms are defined as individual terms printed in user's native language, the source terms comprise source letters, symbols, scripts, and characters;

at least one second replacement sentence, the at least one second replacement sentence is provided below the at least one sentence of the source terms, the at least one second replacement sentence comprises the at least one sentence having each occurrence of the first source letter replaced by the first Hebrew letter and having each occurrence of a second source letter replaced by a second Hebrew letter, the first Hebrew letter and the second Hebrew letter are transliterations of the first source letter and the second source letter, respectively, the at least one second replacement sentence corresponds in number and alignment with a number of the at least one sentence of the source terms printed directly thereabove;

an at least one second supplemental sentence, the at least one second supplemental sentence is printed directly below the at least one second replacement sentence, the at least one second supplemental sentence comprises the source terms having the first source letter replaced by the first Hebrew letter, and having all occurrences of the second source letter replaced by the second Hebrew letter;

a second application section, the second application section follows the at least one second supplemental sentence, wherein the second application section comprises a plurality of writings comprised of prominent compositions, the plurality of writing is in the form of rhymes, poetry, short stories and other literary works, and historical documents including excerpts therefrom, the plurality of writings each comprises a number of sentences which include the source terms each having all occurrences of the first source letter replaced by the first Hebrew letter, and having all occurrences of the second source letter replaced by the second Hebrew letter; and a second unit section, the second unit section follows the second application section, the second unit section comprises a first vertical list of short phrases or sentences printed with the source terms, the source terms having the first source letter and the second source letter replaced by the first Hebrew letter and the second Hebrew letter, respectively, the second unit section further comprises a second vertical list of short phrases or sentences printed adjacent to the first vertical list, wherein the short phrases provided in the second vertical list are identical in number with respect to the short phrases printed in the first vertical list and the short phrases or sentences provided in the second vertical list are horizontally aligned with the short phrases printed in the first vertical list so as to form a corresponding number of rows of text, the short phrases printed in the second vertical list comprise Hebrew language translations of the short phrases printed in the first vertical list, the short phrases printed in the second vertical list are printed in a manner so as to follow a syntax structure of the Hebrew language, the short phrases printed in the second vertical list are adapted to introduce the user of the learning aid to the proper syntax structure and proper transmutative form concerning the Hebrew language; and a plurality of supplemental sections, the plurality of supplemental sections each comprising:

at least one, undisclosed target letter in Hebrew language introduced incrementally with respect to each a successive supplemental section in a manner such that a total number of the Hebrew letters increases incrementally within each the successive supplemental section, and wherein the plurality of supplemental sections each further comprises:

at least one sentence printed with the source terms, wherein the source terms are defined as individual terms printed in user's native language, the source terms comprise source letters, symbols, scripts, and characters;

at least one replacement sentence having each occurrence of source letters replaced by corresponding Hebrew letters;

at least one supplemental sentence printed directly below the at least one replacement sentence;

an application section, the application section follows the at least one supplemental sentence, the application section comprises a plurality of writings in the form of rhymes, poetry, short stories and other literary works, and historical documents, and including excerpts therefrom, comprised of prominent compositions, wherein the plurality of writings each comprises a number of sentences which include a source terms each having all occurrences of a source letter thereof replaced by a first Hebrew letter, the source letter corresponds to a same source letter denoted in the first section, and the first Hebrew letter corresponds to a same first Hebrew letter denoted in the first section; and a unit section following the application section, the unit section comprises a vertical list of short phrases or sentences printed with source terms and provided as a first column, the vertical list of short phrases or sentences having the source letter thereof replaced by the first Hebrew letter, the first column having a second column positioned adjacent thereto and below which an additional vertical list of short phrases or sentences is provided, wherein the short phrases or sentences positioned below the second column are identical in number with respect to the short phrases or sentences provided in the first column and are horizontally aligned therewith so as to form a corresponding number of rows of text, the short phrases or sentences provided in the second column comprise the Hebrew language translations of the short phrases or sentences provided in the first column, the short phrases or sentences provided in the second column are written so as to follow a syntax structure of the Hebrew language, and wherein the first column and the second column are separated by an elongated vertical line imprinted on a page thereof.

* * * * *